United States Patent
Okamoto et al.

(10) Patent No.: US 9,642,072 B2
(45) Date of Patent: May 2, 2017

(54) MOBILE ELECTRONIC DEVICE

(71) Applicant: KYOCERA CORPORATION, Kyoto-shi, Kyoto (JP)

(72) Inventors: Katsuhiro Okamoto, Kyoto (JP); Shigeki Tanabe, Kyoto (JP); Hideki Morita, Kyoto (JP); Shusaku Shinohara, Kyoto (JP)

(73) Assignee: KYOCERA CORPORATION, Kyoto (JP)

( * ) Notice: Subject to any disclaimer, the term of this patent is extended or adjusted under 35 U.S.C. 154(b) by 51 days.

(21) Appl. No.: 14/634,697

(22) Filed: Feb. 27, 2015

(65) Prior Publication Data
US 2015/0181509 A1    Jun. 25, 2015

Related U.S. Application Data

(63) Continuation-in-part of application No. PCT/JP2013/073219, filed on Aug. 29, 2013.

(30) Foreign Application Priority Data

Aug. 30, 2012 (JP) ................................. 2012-190658
Aug. 30, 2012 (JP) ................................. 2012-190659

(51) Int. Cl.
*H04B 7/00* (2006.01)
*H04W 48/16* (2009.01)
(Continued)

(52) U.S. Cl.
CPC ....... *H04W 48/16* (2013.01); *H04M 1/72569* (2013.01); *H04W 52/0254* (2013.01); *H04M 1/7253* (2013.01); *H04M 2250/06* (2013.01)

(58) Field of Classification Search
CPC .......... H04L 2012/5608; H04W 84/12; H04W 88/08; H04W 80/04; H04W 88/06;
(Continued)

(56) References Cited

U.S. PATENT DOCUMENTS 7,826,803 B2    11/2010 Takasu
8,116,755 B2 *  2/2012 Ootsuka .................. G01S 11/02
                                                    342/104
(Continued)

FOREIGN PATENT DOCUMENTS

JP    11-69438 A    3/1999
JP    2009-44309 A  2/2009
(Continued)

OTHER PUBLICATIONS

Office Action mailed May 26, 2015, corresponding to Japanese patent application No. 2012-190659, for which an explanation of relevance is attached.
(Continued)

*Primary Examiner* — Brenda H Pham
(74) *Attorney, Agent, or Firm* — Hauptman Ham, LLP

(57) ABSTRACT

According to an embodiment of the disclosure, a mobile electronic device according to the present invention is provided with an acceleration sensor, a communication unitmodule, and a control unitmodule. The acceleration sensor detects acceleration. The communication unitmodule performs communication. The control unitmodule controls the communication unitmodule to search for a base station, in some cases.

5 Claims, 7 Drawing Sheets

(51) Int. Cl.
*H04M 1/725* (2006.01)
*H04W 52/02* (2009.01)
(58) Field of Classification Search
CPC . H04W 84/18; H04W 36/18; H04W 36/0011; H04W 36/14; H04W 36/08
USPC ............ 370/310.2, 328, 331, 332, 338, 349
See application file for complete search history.

(56) References Cited

U.S. PATENT DOCUMENTS

| 2006/0056448 | A1* | 3/2006 | Zaki ................. | H04W 36/0066 370/466 |
| 2008/0107082 | A1* | 5/2008 | Igarashi ............... | H04W 36/02 370/331 |
| 2009/0156131 | A1  | 6/2009 | Takasu | |
| 2012/0220302 | A1* | 8/2012 | Ebara ................. | H04W 64/006 455/437 |

FOREIGN PATENT DOCUMENTS

| JP | 2009-152663 A | 7/2009 |
| JP | 2009-303234 A | 12/2009 |

OTHER PUBLICATIONS

Office Action mailed Apr. 7, 2015, corresponding to Japanese patent application No. 2013-105603, for which an explanation of relevance is attached.

\* cited by examiner

MOBILE ELECTRONIC DEVICE

CROSS-REFERENCE TO RELATED APPLICATION

The present application is a Continuation-In-Part application of PCT international application Ser. No. PCT/JP2013/073219 filed on Aug. 29, 2013 which designates the United States, incorporated herein by reference, and which is based upon and claims the benefit of priority from Japanese Patent Application No. 2012-190658 filed on Aug. 30, 2012 and Japanese Patent Application No. 2012-190659 filed on Aug. 30, 2012, the entire contents of which are incorporated herein by reference.

FIELD

The present disclosure relates generally to a mobile electronic device and particularly to mobile electronic device with wireless communication capability.

BACKGROUND

Mobile electronic devices may perform wireless communication with a variety of communication standard. For example, a mobile electronic device may perform wireless communication with a wireless communication system such as Wi-Fi (registered trademark) conforming to IEEE 802.11 and a wireless LAN system.

In such systems, a mobile electronic device searches for a Wi-Fi-enabled base station when no connection is established while moving.

SUMMARY

According to an embodiment of the disclosure, a mobile electronic device provided with an acceleration sensor, a communication module, and a control module. The acceleration sensor detects acceleration. The communication module performs communication. The control module controls the communication module to search for a base station, in some cases.

DETAILED DESCRIPTION

Figure 1:
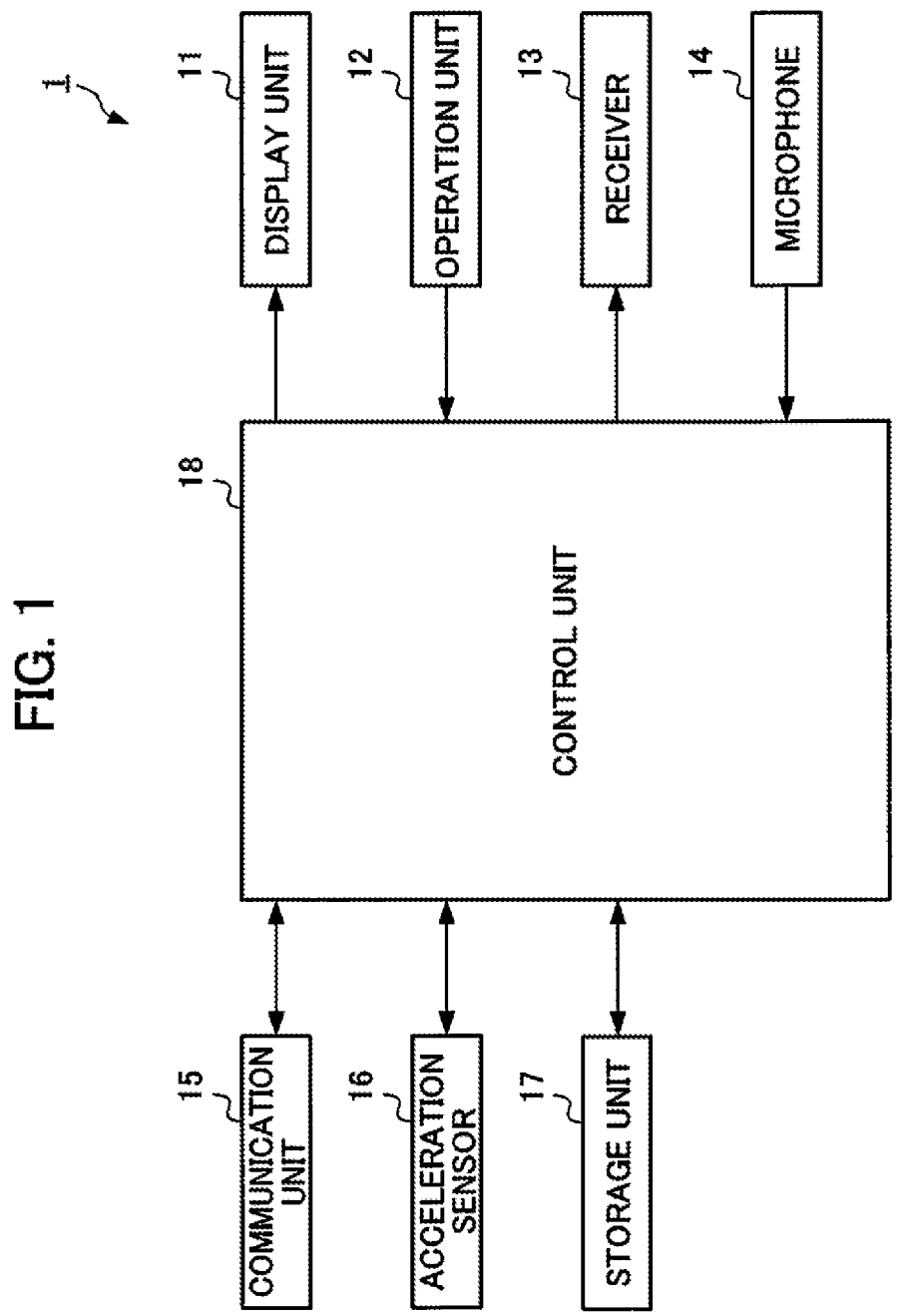
FIG. 1 is a block diagram showing a configuration of a mobile telephone device according to an embodiment.

Embodiments of the present disclosure are described in detail with reference to the drawings. In the following description, a mobile telephone device 1 is described as an example of the electronic device. FIG. 1 is a block diagram showing a configuration of a mobile telephone device according to an embodiment.

As shown in FIG. 1, the mobile telephone device 1 may include a display module 11, an operation module 12, a receiver 13, a microphone 14, a communication module 15, an acceleration sensor 16, a storage module 17, and a control module 18.

The display module 11 may include a display device. The display device may include a liquid crystal display, an organic EL (electroluminescence) panel, or the like. The display module 11 can display characters, images, symbols, graphics, etc.

The operation module 12 may include a plurality of buttons. A user operates the operation module 12. The operation module 12 may include a single button. The receiver 13 can convert audio signals transmitted from the control module 18 into speech, and outputs the speech.

The communication module 15 may include one or more antennas and RF circuit modules. The communication module 15 can perform communication by communication schemes respectively corresponding to a plurality of wireless communication standards. The communication module 15 enables communication by cellular phone communication standards such as 2G, 3G and 4G, or enables communication by a wireless LAN standard. The wireless LAN standard may conform to IEEE 802.11, such as a Wi-Fi (registered trademark) wireless communication standard. The communication module 15 enables communication by a WiMAX (registered trademark) wireless communication standard. The antennas and RF circuit modules correspond to the communication schemes, respectively. The description below has an assumption in which the communication module 15 performs communication by Wi-Fi.

The acceleration sensor 16 can detect a direction and level of acceleration acting on the mobile telephone device 1. The acceleration sensor 16 outputs a detection result to the control module 18. The acceleration sensor 16 includes, but not limited to a 3G (three-dimensional) acceleration sensor for detecting acceleration in an X-axis direction, a Y-axis direction, and a Z-axis direction.

The acceleration sensor 16 may includes a piezo-resistive sensor or a capacitive sensor, but it is not limited thereto. For example, the acceleration sensor 16 may include a sensor such as: a piezoelectric element (piezoelectric type); an MEMS (Micro Electro Mechanical System) type, which is based on a thermal detection scheme; a servo type, in which a movable coil is returned by a feedback electric current; and a strain gauge type, in which a strain gauge measures distortion generated by acceleration.

The storage module 17 may perform arithmetic processing by an instruction from the control module 18. The storage module 17 may include a memory, etc. The storage module 17 stores one or more applications that can operate inside the mobile telephone device 1. The storage module 17 may concurrently serve as removable external memory.

The control module 18 can control the entirety of the mobile telephone device 1. The control module 18 may include a central processing module (CPU), etc.

Figure 2:
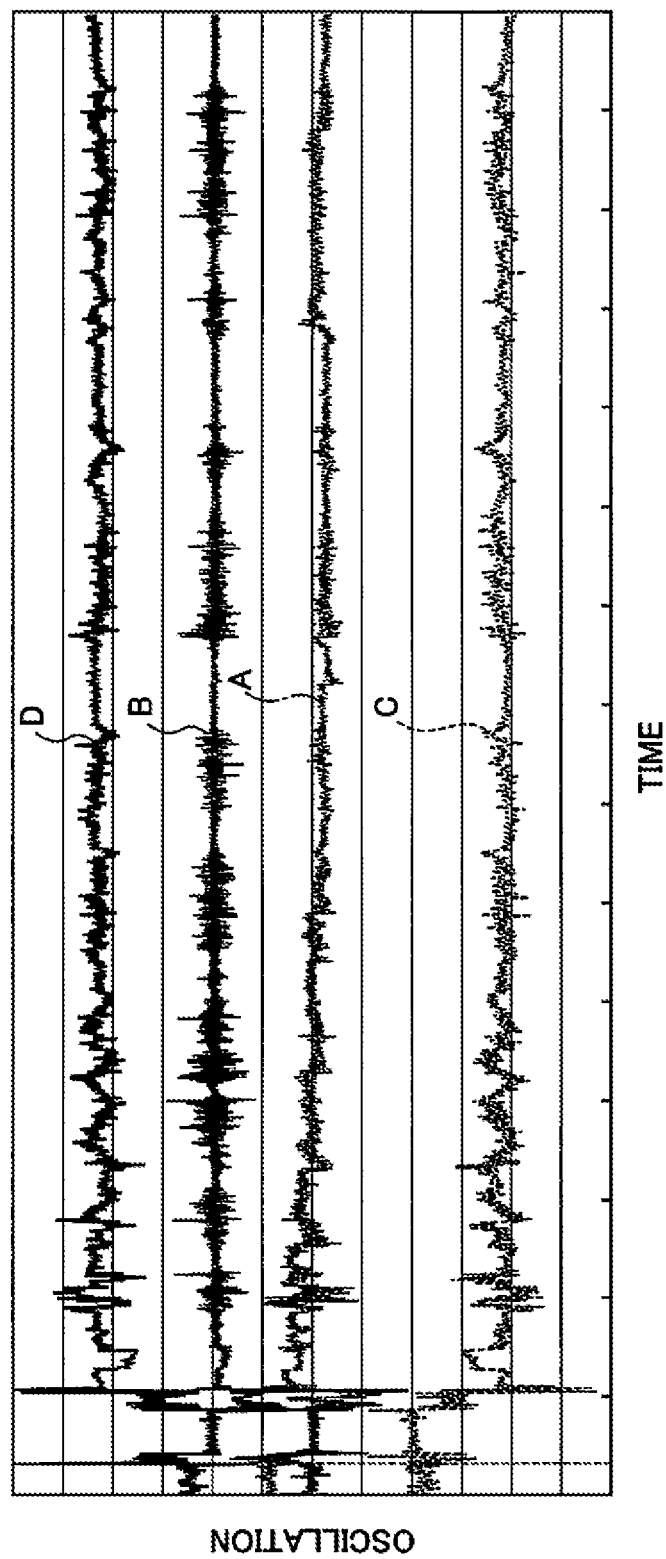
FIG. 2 is a diagram schematically showing results of detection by an acceleration sensor in an embodiment.

The control module 18 can operate a result of detection by the acceleration sensor 16. FIG. 2 is a diagram schematically showing the results of detection by the acceleration sensor. As shown in FIG. 2, acceleration in the X-axis direction (A in FIG. 2), acceleration in the Y-axis direction (B in FIG. 2), acceleration in the Z-axis direction (C in FIG. 2), and a vector value synthesizing these accelerations (D in FIG. 2) are transmitted to the control module 18, as results of detection by the acceleration sensor 16. The control module 18 can log the synthesized vector value, analyze a logged data, and determine the status of the mobile telephone device 1. The logged data can be stored in the storage module 17.

When determining the status of the mobile telephone device 1, the control module 18 can use acceleration patterns. The acceleration patterns may be stored in the storage module 17 in advance. The acceleration patterns may include a staying state and a variety of moving states. The acceleration patterns can be measured and extracted in advance of some use cases. Each one of the acceleration patterns may include characteristic patterns detected by the acceleration sensor 16. The characteristic patterns may indicate each one of the moving states. The use cases may include a first case, a second case, and a third case. In the first case, the mobile telephone device 1 is staying and the first case may be called as a staying state. In the second case, a user carrying the mobile telephone device 1 is walking. In the third case, the user is riding on a vehicle. In an embodiment, for each one of the staying state and the plurality of moving states, an acceleration pattern corresponding to the logged data of the synthesized vector value described above is stored in the storage module 17 in advance. The control module 18 can determine the status of the mobile telephone device 1 by comparing the logged data of the synthesized vector value described above with the acceleration patterns.

The mobile telephone device 1 according to an embodiment can search a base station suitable for each status of the mobile telephone device 1. The control module 18 can determine whether the status of the mobile telephone device 1 has made a transition from one state to another, based on acceleration detected by the acceleration sensor 16.

When the status of the mobile telephone device 1 has made a transition from the moving state to the staying state, the control module 18 may cause the communication module 15 to search a Wi-Fi-enabled base station (access point).

The staying state can be defined as a state where the mobile telephone device 1 is putting on somewhere. When the acceleration sensor 16 cannot detect significant acceleration, the control module 18 can determine that the status is the staying state. Alternatively, when acceleration detected by the acceleration sensor 16 is below a predetermined value near zero, the control module can determine that the status is the staying state.

The control module 18 can determine that the status is any one of the first to fifth moving state based on whether the status is a state of riding any one of a bicycle, car or train, or the walking state.

In the first moving state, a user of the mobile telephone device 1 is not riding any vehicle. The first moving state may be defined as the walking state. In other words, a user carrying the device 1 is walking in the first state.

In the second moving state, a user carrying the device 1 is moving by car. That is, the user is riding on the car that is moving. In the third moving state, a user carrying the device 1 is moving by bicycle. That is, the user is riding on a bicycle that is moving. In the fourth moving state, a user carrying the device 1 is moving by train. That is, the user is riding the train. In the fifth moving state, a user carrying the device 1 is moving by other transportation means. For example, in the fifth moving state, a user may be in an airplane flying in the air.

The control module 18 determines whether the status of the mobile telephone device 1 has transitioned from one state to another, based on the determined state. If the control module 18 determines that the status of the mobile telephone device 1 has transitioned from the moving state to the staying state, the control module 18 may cause the communication module 15 to search a Wi-Fi-enabled base station. When a Wi-Fi-enabled base station is found, the control module 18 can attempt communication connection with the Wi-Fi-enabled base station. The control module 18 can repeat the search for the Wi-F-enabled base station until communication connection has established; however, it is not limited thereto. For example, when a Wi-Fi enabled base station is not found within a certain time interval, the control module 18 may stop searching the Wi-F-enabled base station. The certain time interval may be one minute. Alternatively, the certain time interval may be thirty seconds or three minutes.

In this manner, when the state has transitioned to the staying state where the user can easily perform data communication, the mobile telephone device 1 searches a Wi-Fi-enabled base station. When a user can easily perform data communication, the mobile telephone device 1 searches a Wi-Fi base station to attempt communication connection therewith. the user convenience is improved. The electric power consumption can be reduced, as compared to a case of continuously performing a search.

As described above, when the control module 18 can determine that the status of the mobile telephone device 1 has transitioned from the moving state to the staying state, the control module 18 can control the communication module 15 to search for a Wi-Fi-enabled base station. However, it is not limited in this case. In another embodiment, the control module 18 may perform control in greater detail, based on whether the status is any one of the plurality of moving states.

When the control module 18 can determine that the walking state has transitioned to the staying state, based on acceleration detected by the acceleration sensor 16, the control module 18 can search for a Wi-Fi-enabled base station. Here, the walking state may be the first moving state, as described above.

When the control module 18 determines that the riding state has transitioned to the staying state based on acceleration detected by the acceleration sensor 16, the control module 18 can perform control not to search for a Wi-Fi enabled base station. Here, the riding state may be any one of the second moving state, the third moving state, the fourth moving state, and the fifth moving state.

When the user is riding a vehicle and the vehicle has transitioned from moving state to stopping state, the vehicle will start moving again or the user will start moving on foot after getting off from the vehicle. In the second to fifth moving states, the user of the mobile telephone device 1 is less likely to perform data communication than the first moving state. When the riding state has transitioned to the staying state, the mobile telephone device 1 can perform control not to search for the Wi-F-enabled base station. The mobile telephone device 1 can reduce the electric power consumption as compared to a case of always searching for the Wi-F-enabled base station.

When the walking state has transitioned to the staying state, the mobile telephone device 1 can search for a Wi-Fi-enabled base station. When the walking state has transitioned to the staying state, the user may have arrived at a destination. The mobile telephone device 1 can search for the Wi-F-enabled base station when the walking state has transitioned to the staying state. Therefore, the convenience may be improved.

As described above, the staying state is a state where the mobile telephone device 1 is putting on somewhere; however, it is not limited thereto. For example, when a certain condition is satisfied, the mobile telephone device 1 can determine that the status is the staying state, and may control the communication module 15 to search for a Wi-Fi-enabled base station. Here, the certain condition can be defined as a substantially staying state, i.e. a state where acceleration detected a slight amount (a state less than a predetermined value) by the acceleration sensor 16.

For example, when the user is holding the mobile telephone device 1 in his/her hand, even if the user thinks that the mobile telephone device 1 is in stillness, a slight amount of acceleration may be detected by the acceleration sensor 16. Accordingly, when the user is holding the mobile telephone device 1 in his/her hand, the mobile telephone device 1 can determine that the status is the staying state, and searches for the Wi-F-enabled base station. Therefore, the convenience may be improved.

When the acceleration detected by the acceleration sensor 16 is less than a certain value for a certain time interval, i.e. when the staying state is maintained for a certain time interval, the mobile telephone device 1 may control the communication module 15 to search for a Wi-Fi-enabled base station. The predetermined time interval is, for example, five seconds.

When the mobile telephone device 1 maintains the staying state for a certain time interval, it is more likely that the user has arrived at a destination, as compared to a case in which the mobile telephone device 1 does not maintain the staying state for the certain time interval. The mobile telephone device 1 can further improve convenience by searching for a Wi-Fi-enabled base station in conformity with user behavior.

Figure 3:
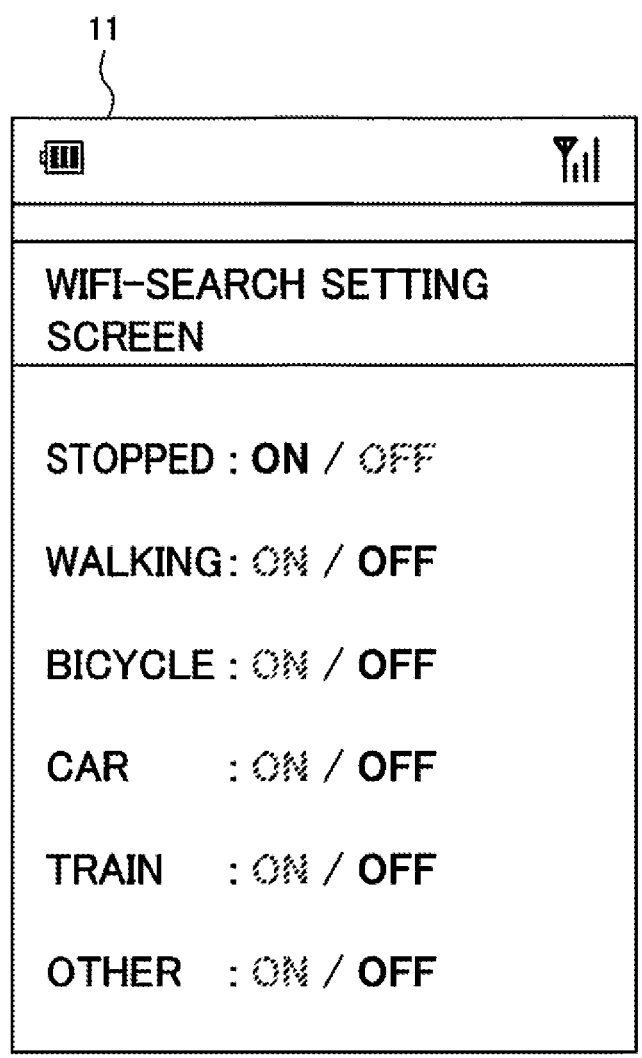
FIG. 3 is a diagram showing a screen example for setting whether to allow a search for a base station in each state.

The control module 18 may allow the user to set whether to search for a Wi-Fi-enabled base station in cases of having transitioned to the moving states. The storage module 17 can store the first to fifth moving states in association with respective setting information on whether to search for a Wi-Fi-enabled base station. The control module 18 may cause the display module 11 to display a setting screen shown in FIG. 3 to receive a setting on whether to search for a Wi-Fi-enabled base station in the respective moving states. Here, FIG. 3 is a diagram showing a screen, as a example, for setting whether to allow a search for the Wi-F-enabled base station in the respective states.

In this manner, the mobile telephone device 1 can search for a Wi-Fi base station in a case of that a user is riding in a vehicle, in response to a request by the user.

Figure 4:
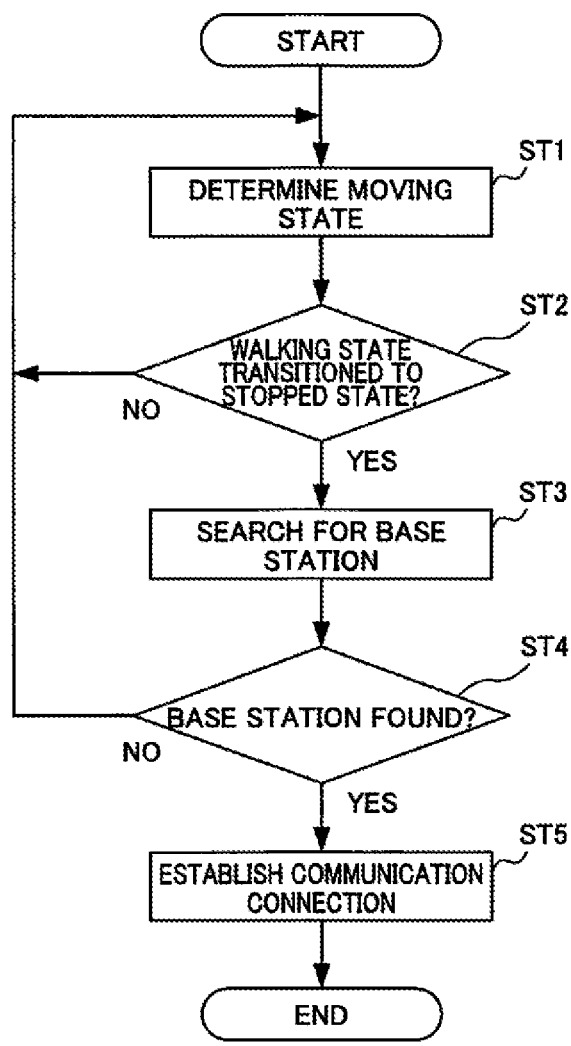
FIG. 4 is a flowchart for illustrating operations of the mobile telephone device according to an embodiment.

Flow of operations of the mobile telephone device 1 is described with reference to a flowchart shown in FIG. 4. FIG. 4 is a flowchart for illustrating the operations of the mobile telephone device according to an embodiment. Described in a following embodiment, the status is determined in real time; however, it is not limited thereto. The status may be determined at each certain periodical time interval. The mobile telephone device 1 can activate a predetermined application by a user operation; starts measuring acceleration in response to an operation to start measuring; and finishes measuring acceleration in response to an operation to finish measuring; however, it is not limited thereto. For example, the mobile telephone device 1 may start measuring acceleration at start time designated by a timer, and/or may finish measuring acceleration at finish time designated by the timer.

In Step ST1, the control module 18 determines whether the status of the mobile telephone device 1 is each one of moving state, based on a result of detection by the acceleration sensor 16.

In Step ST2, the control module 18 determines whether the walking state has transitioned to the staying state. When the determination is YES, the control module 18 advances the processing to Step ST3. When the determination is NO, the control module 18 returns the processing to Step ST1.

In Step ST3, the control module 18 controls the communication module 15 to search for a Wi-Fi-enabled base station.

In Step ST4, the control module 18 determines whether the base station is found. When the determination is YES, the control module 18 advances the processing to Step ST5. When the determination is NO, the control module 18 returns the processing to Step ST1.

In Step ST5, the control module 18 controls the communication module 15 to establish communication connection with the base station found by the searching.

According to a above embodiment, when the mobile telephone device 1 determines that the status of the mobile telephone device 1 has transitioned from the moving state to the staying state, based on acceleration detected by the acceleration sensor 16, the mobile telephone device 1 can control the communication module 15 to search for a Wi-Fi-enabled base station.

When the state has transitioned to the staying state where the user can easily perform data communication, the mobile telephone device 1 can search for a Wi-Fi-enabled base station. Therefore, the user convenience can be improved. The mobile telephone device 1 can reduce the electric power consumption as compared to a case of always performing a search.

An embodiment of the present disclosure has been described above; however, the present disclosure is not limited to an above embodiment.

In an above embodiment, the mobile telephone device 1 can search for a Wi-Fi-enabled base station in a case of having transitioned to the staying state; however, it is not limited thereto. For example, if the communication module 15 can conform to, for example, communication by a wireless LAN standard, and when the control module 18 is determined that the moving state has transitioned to the staying state based on an acceleration detected by the acceleration sensor 16, the communication module 15 may contrail to search for a wireless LAN standard. The wireless LAN standard may be, for example, a wireless communication standard conforming to IEEE 802.11, Bluetooth (registered trademark), IrDA, NFC (Near Field Communication), etc.

In an above embodiment, the mobile telephone device 1 can determine that the status of the mobile telephone device 1 is the staying state or any one of the plurality of moving states, based on acceleration detected by the acceleration sensor 16; however, it is not limited thereto. For example, the mobile telephone device 1 may measure the position of the mobile telephone device 1 by using GPS (Global Positioning System), and may determine that the status of the mobile telephone device 1 is the staying state or any one of the plurality of moving states, based on displacement of the mobile telephone device 1 per unit time (predetermined time interval).

Figure 5:
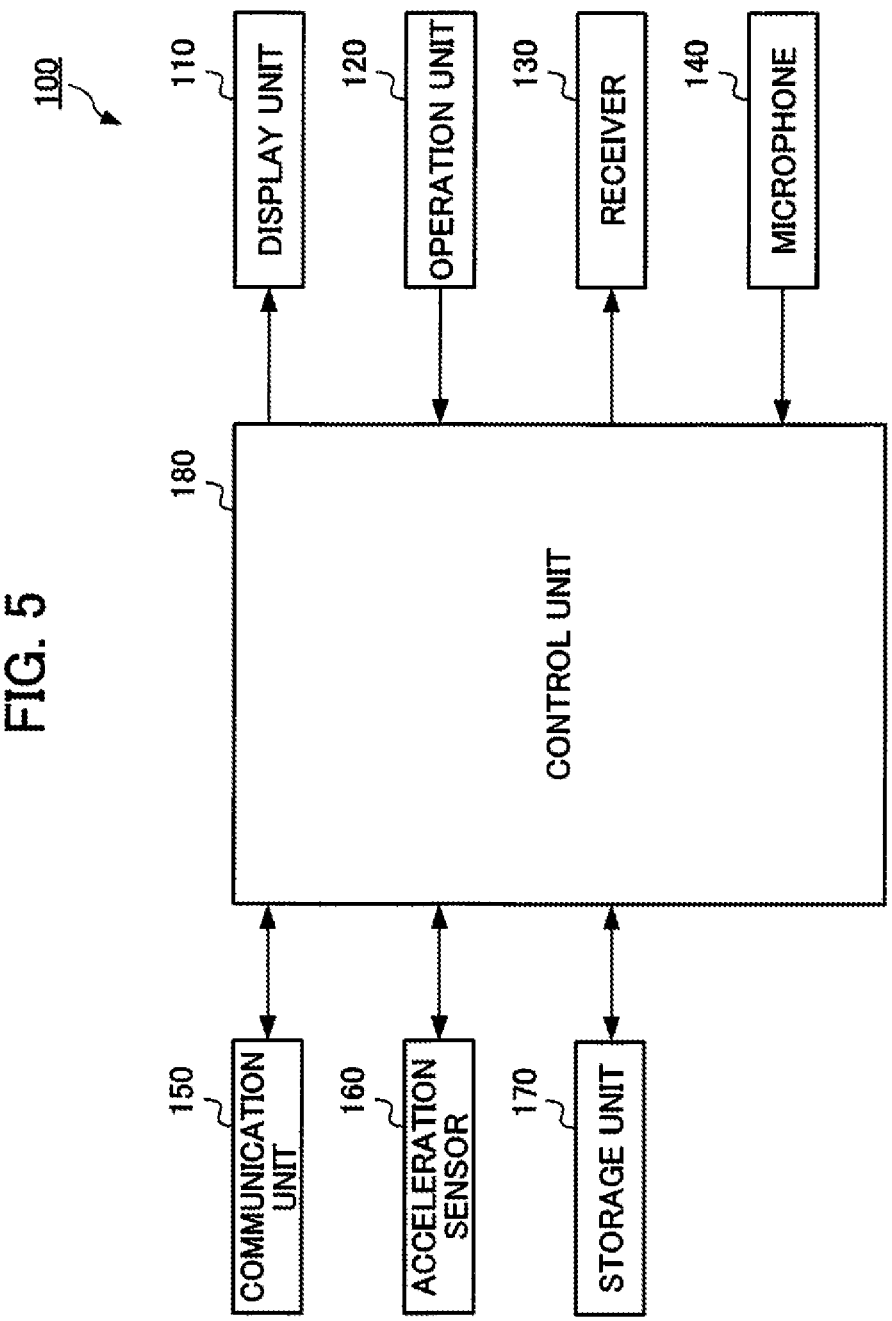
FIG. 5 is a block diagram showing a configuration of a mobile telephone device according to an embodiment.

According to an embodiment, a mobile telephone device 100 is described as an example of the electronic device. FIG. 5 is a block diagram showing a configuration of a mobile telephone device according to an embodiment.

As shown in FIG. 5, the mobile telephone device 101 may include a display module 110, an operation module 120, a receiver 130, a microphone 140, a communication module 150, an acceleration sensor 160, a storage module 170, and a control module 180.

The display module 110 may include a display device. The display device may include, for example, a liquid crystal display, an organic EL (electroluminescence) panel, or the like. The display module 110 displays characters, images, symbols, graphics, etc.

The operation module 120 may include a plurality of buttons. A user operates the operation module 120. The operation module 120 may include a single button. The receiver 130 can convert audio signals transmitted from the control module 180 into speech, and outputs the speech.

The communication module 150 may include one or more antennas and RF circuit modules. The communication module 150 can perform communication by communication schemes respectively corresponding to a plurality of wireless communication standards. The communication module 15 enables communication by a communication standard The communication standard may conform to cellular phone communication standards such as 2G, 3G and 4G. The communication module 150 enables communication by a wireless LAN standard. The wireless LAN standard may conform to IEEE 802.11, such as, for example, a Wi-Fi (registered trademark) wireless communication standard. The communication module 150 may perform communication by a WiMAX (registered trademark) wireless communication standard. The antennas and RF circuit modules correspond to the communication schemes, respectively. The description below has an assumption in which the communication module 150 performs communication by Wi-Fi.

The communication module 150 may include: a first communication module that performs communication by a first communication standard, which is a communication standard conforming to cellular phone communication standards such as 2G, 3G and 4G; and a second communication module that performs communication by a second communication standard, which is a wireless LAN standard. The second communication system may be a wireless communication system conforming to IEEE 802.11, a WiMAX wireless communication system, Bluetooth (registered trademark), IrDA, or NFC (Near Field Communication).

The acceleration sensor 160 can detect a direction and level of acceleration acting on the mobile telephone device 100. The acceleration sensor 160 can output a detection result to the control module 180. The acceleration sensor 160 is a three dimensional acceleration sensor for detecting acceleration in an X-axis direction, a Y-axis direction, and a Z-axis direction.

The acceleration sensor 160 may include, for example, a piezo-resistive sensor or a capacitive sensor, but it is not limited thereto. For example, the acceleration sensor 160 may includes a sensor such as a piezoelectric element (piezoelectric type); an MEMS (Micro Electro Mechanical System) type, which is based on a thermal detection scheme; a servo type, in which a movable coil is returned by a feedback electric current; and a strain gauge type, in which a strain gauge measures distortion generated by acceleration.

The storage module 170 may perform arithmetic processing by an instruction from the control module 180. The storage module 170 may include a memory, etc. The storage module 170 can store one or more applications that can operate inside the mobile telephone device 100. The storage module 170 may concurrently serve as removable external memory.

The control module 180 can control the entirety of the mobile telephone device 100. The control module 180 may include a central processing module (CPU), etc.

Figure 6:
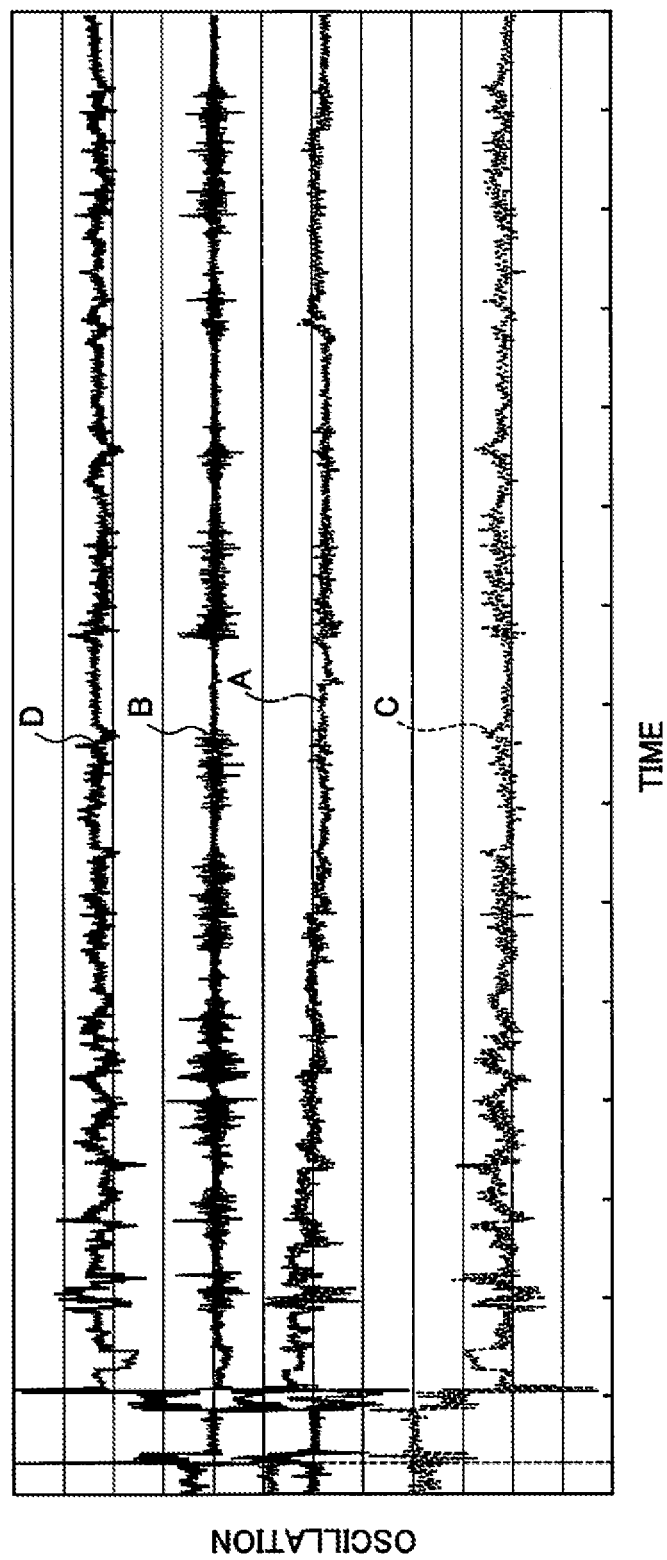
FIG. 6 is a diagram schematically showing results of detection by an acceleration sensor in an embodiment.

The control module 180 can operate a result of detection by the acceleration sensor 160. FIG. 6 is a diagram schematically showing the results of detection by the acceleration sensor. As shown in FIG. 6, acceleration in the X-axis direction (A in FIG. 6), acceleration in the Y-axis direction (B in FIG. 6), acceleration in the Z-axis direction (C in FIG. 6), and a vector value synthesizing these acceleration (D in FIG. 6) are transmitted to the control module 180, as result of detection by the acceleration sensor 160. The control module 180 can log the synthesized vector value. The control module 180 can analyzes a logged data. The control module 180 can determine a status of the mobile telephone device 100. The logged data can be stored into the storage module 170.

When determining a status of the mobile telephone device 100, the control module 180 can use, for example, acceleration patterns. The acceleration patterns may include staying state and a variety of moving states stored in the storage module 170 in advance. The acceleration patterns can be measured and extracted in advance of some use cases. Each one of the acceleration patterns may include characteristic patterns detected by the acceleration sensor 160. The characteristic patterns may indicate each one of the moving states. The use cases may include a first case, a second case, and a third case. In the first case, the mobile telephone device 100 is staying and the first case may be called as a staying state. In the second case, a user carrying the mobile telephone device 100 is walking state. In the third case is a user is riding on a vehicle. In an embodiment, for each one of the staying state and the plurality of moving states, an acceleration pattern corresponding to the logged data of the synthesized vector value described above is stored in the storage module 170 in advance. The control module 180 can determine a status of the mobile telephone device 100 by comparing the logged data of the synthesized vector value described above with the acceleration patterns.

The mobile telephone device 100 may be reducing unstable communication state by determining the status of the mobile telephone device 100.

The control module 180 can function as a determination module. The control module 180 can determine whether the status of the mobile telephone device 100 is the staying state or any one of the plurality of moving states, based on acceleration detected by the acceleration sensor 160.

For example, as the plurality of moving states, the control module 18 can determine that the status is any one of first to fifth moving states. The staying state can be defined as a state where the mobile telephone device 100 is putting on somewhere or is substantially staying in position. In the fourth or fifth case, the control module 180 can determine that the status is the staying state. In the fourth case, significant acceleration is not detected by the acceleration sensor 160. In the fifth case, a slight amount of acceleration is detected by the acceleration sensor 160.

When the control module 180 determines that the status of the mobile telephone device 100 has transitioned from the moving state to the staying state, the control module 180 controls the communication module 150 to search for a Wi-Fi-enabled base station (access point). When a Wi-Fi-enabled base station is found, the control module 180 can establish communication connection with the base station.

After establishing the communication connection with the Wi-Fi-enabled base station, the control module 180 can determine whether the mobile telephone device 100 has transitioned from the staying state to moving state. When the control module 180 determines that the mobile telephone device 100 has transitioned from the staying state to the moving state, the control module 180 may control the communication module 150 to disconnect the Wi-Fi communication. A disconnecting communication can be defined as disconnecting a wireless link. When the communication module 150 communicate a data communication by Wi-Fi (as a first communication standard), the control module 180 can control the communication module 150 to continue the data communication by a cellular phone communication standard (as a second communication standard). The control module 180 can shift from a communication (one of data communication) to communication by a cellular phone communication standard (another data communication).

When the mobile telephone device 100 has transitioned from the staying state to the moving state, the mobile telephone device 100 can disconnect the Wi-Fi communication. Therefore, the mobile telephone device 100 can reduce a rate to become unstable communication states caused by a user's movement. By disconnecting the Wi-Fi communication, the mobile telephone device 100 can finish the Wi-Fi communication quickly, when the mobile telephone device 100 has transitioned from the staying state to the moving state. After disconnecting the Wi-Fi communication, the mobile telephone device 100 resumes the data communication by a cellular phone communication standard. Therefore, data communication in the mobile telephone device 100 may be in a stable communication state.

The control module 180 may disconnect Wi-Fi communication, based on electric field intensity. The control module 180 can function as a detection module. The control module 180 can control the communication module 150 to detect field intensity of radio waves: the radio waves may be received from a Wi-Fi base station. The Wi-Fi base station with which communication connection has been established.

When the mobile telephone device 100 has transitioned from the staying state to the moving state, if the radio field intensity of the radio waves received from the connected base station is less than a threshold, the control module 180 may control the communication module 150 to disconnect the Wi-Fi communication. On the other hand, when the mobile telephone device 100 has transitioned from the staying state to the moving state, if the radio field intensity of the radio waves received from the connected base station is greater than the threshold, the control module 180 may control the communication module 150 to maintain the Wi-Fi communication.

According to an above embodiment, the mobile telephone device 100 may disconnect the Wi-Fi communication.

The control module 180 may disconnect Wi-Fi communication, based on distance moved by the mobile telephone device 100. The control module 180 can function as a calculation module. The control module 180 can calculate the distance moved by the mobile telephone device 100. The control module 180 can calculate the distance based on acceleration detected by the acceleration sensor 160. When a calculated distance is greater than a threshold, the control module 180 may raise the above threshold for maintain/disconnect. The calculated distance is calculated during a certain time interval after transition of the mobile telephone device 100 from the staying state to the moving state.

The mobile telephone device 100 can rise the threshold for maintain/disconnect in accordance with movement of the mobile telephone device 100. Therefore, the mobile telephone device 100 can disconnect a communication easily before the communication state becomes unstable due to movement of the mobile telephone device 100.

Figure 7:
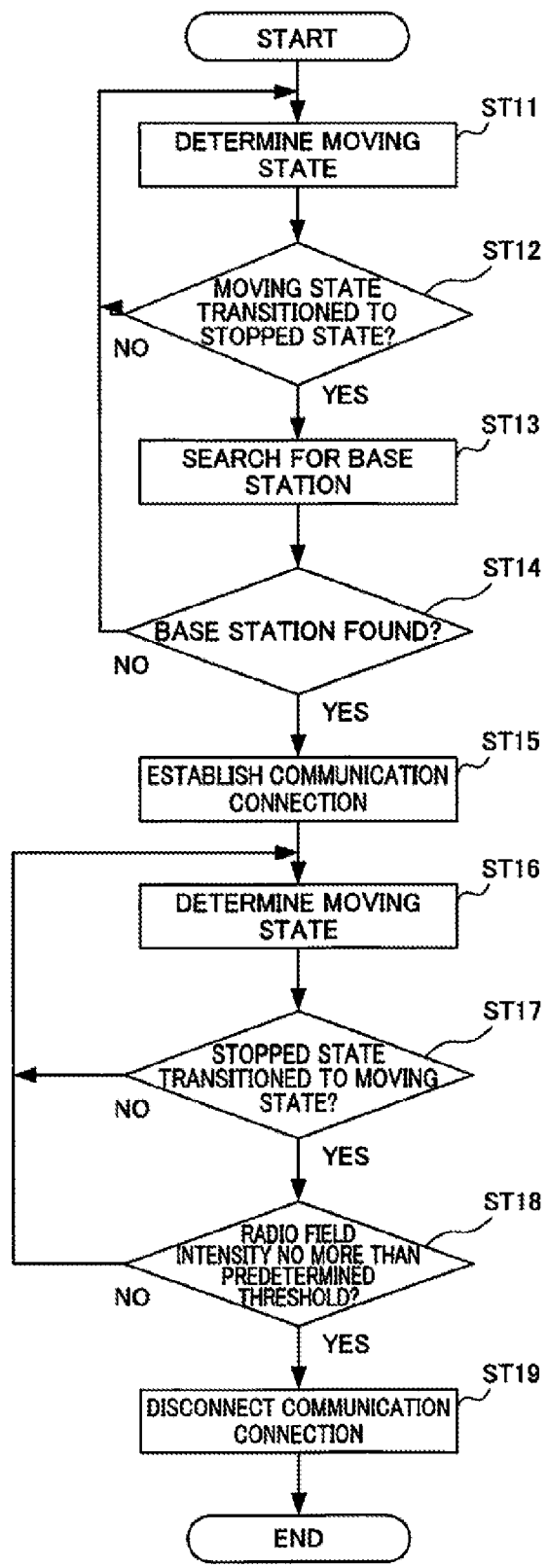
FIG. 7 is a flowchart for illustrating operations of the mobile telephone device according to an embodiment.

Flow of operations of the mobile telephone device 100 is described with reference to a flowchart shown in FIG. 7. FIG. 7 is a flowchart for illustrating the operations of the mobile telephone device according to an embodiment. Described in a following embodiment, a status is determined in real time; however, it is not limited thereto. A status may be determined at each certain periodical time interval. The mobile telephone device 100 can activate a predetermined application by a user operation; starts measuring acceleration in response to an operation to start measuring; and finishes measuring acceleration in response to an operation to finish measuring; however, it is not limited thereto. For example, the mobile telephone device 100 may start measuring acceleration at start time designated by a timer, and/or may finish measuring acceleration at finish time designated by the timer.

In Step ST11, the control module 180 determines whether the status of the mobile telephone device 100 is each moving state, based on a result of detection by the acceleration sensor 160.

In Step ST12, the control module 180 determines whether the moving state has transitioned to the staying state. When the determination is YES, the control module 180 advances the processing to Step ST13. When the determination is NO, the control module 180 returns the processing to Step ST11.

In Step ST13, the control module 180 controls the communication module 150 to search for a Wi-Fi-enabled base station.

In Step ST14, the control module 180 determines whether a base station is found. When the determination is YES, the control module 180 advances the processing to Step ST15. When the determination is NO the control module 180 returns the processing to Step ST11.

In Step ST15, the control module 180 controls the communication module 150 to establish communication connection with the base station found by the searching.

In Step ST16, similarly to Step ST11, the control module 180 determines the respective moving states, based on a result of detection by the acceleration sensor 160.

In Step ST17, the control module 180 determines whether the staying state has transitioned to the moving state. When the determination is YES, the control module 180 advances the processing to Step ST18. When the determination is NO, the control module 180 returns the processing to Step ST16.

In Step ST18, the control module 180 determines whether the detected radio field intensity is no more than a predetermined threshold. When the determination is YES, the control module 180 advances the processing to Step ST19. When the determination is NO, the control module 180 returns the processing to Step ST16.

In Step ST19, the control module 180 disconnects the communication connection with the Wi-Fi-enabled base station.

According to a above embodiment, after establishing communication connection with the Wi-Fi-enabled base station, the control module 180 can determine whether the mobile telephone device 100 has transitioned from the staying state to moving state. When the control module 180 determines that the mobile telephone device 100 has transitioned from the staying state to the moving state, the control module 180 can control the communication module 150 to disconnect the Wi-Fi communication. Subsequently, when the communication mobile 150 perform data communication by Wi-Fi communication standard, the control module 180 resumes the data communication by a cellular phone communication standard.

When the mobile telephone device 100 has transitioned from the staying state to the moving state, the mobile telephone device 100 can disconnect the Wi-Fi communication; therefore, the mobile telephone device 100 can reduce a rate to become unstable communication states caused by a user's movement.

Some embodiments of the present disclosure are described above; however, the present disclosure is not limited to the aforementioned embodiments.

In the aforementioned embodiments, a control module 180 can determine that the status of the mobile telephone device 100 is the staying state or any one of the plurality of moving states, based on acceleration detected by the acceleration sensor 160; however, it is not limited thereto. For example, the mobile telephone device 100 may measure a position of the mobile telephone device 100 by using GPS (Global Positioning System), and may determine that the status of the mobile telephone device 100 is the staying state or any one of the plurality of moving states, based on displacement of the mobile telephone device 100 per unit time (time interval).

The invention claimed is:

1. A mobile electronic device, comprising:
an acceleration sensor configured to
detect an acceleration of the device, and
output an accelerative signal indicating a value of the acceleration;
a communicator configured to perform wireless communication with a base station;
a detector configured to detect electric field intensity of radio waves received from the base station;
a calculator configured to calculate a distance moved by the mobile electronic device, based on the accelerative signal, and
a controller configured to
determine a moving status based on the accelerative signal, the moving status comprising:
a moving state in which the device is moving, and
a stopped state in which the device is stopped, and
cause the communicator to search for a base station to communicate, when the moving status changes from the moving state to the stopped state,
wherein
the communicator is configured to perform the wireless communication with the base station by a wireless LAN communication,
when the detected electric field intensity is no more than a threshold while the moving status is the moving state, the controller is configured to disconnect the wireless LAN communication with the base station,
when the calculated distance is at least a certain value, the controller is configured to raise the threshold, and
the calculated distance is calculated during a time interval after the moving status changes from the stopped state to the moving state.

2. The mobile electronic device according to claim 1, wherein
the moving state includes a walking state in which a user is walking, and
the controller is further configured to:
determine whether the moving status is the walking state based on the accelerative signal, and
determine the walking state as one of the moving status based on the accelerative signal.

3. The mobile electronic device according to claim 1, wherein
the moving state includes a riding state in which a user is riding on a vehicle, and
the controller is configured to
determine the riding state as one of the moving status based on the accelerative signal, and
when the controller determines that the riding state has transitioned to the stopped state, cause the communicator not to search for the base station.

4. A mobile electronic device, comprising:
a communicator configured to perform wireless communication with a base station;
a detector configured to detect electric field intensity of radio waves received from the base station;
an acceleration sensor configured to
detect an acceleration of the device, and
output an accelerative signal indicating a value of the acceleration; and
a calculator configured to calculate a distance moved by the mobile electronic device, based on the accelerative signal,
a controller configured to
determine a moving status based on the accelerative signal, the moving status comprising:
a moving state in which the device is moving, and
a stopped state in which the device is stopped, and
cause the communicator to disconnect the wireless communication with the base station, when the controller determines the moving state as the moving status,
wherein
the communicator is configured to perform the wireless communication with the base station by a wireless LAN communication,
when the detected electric field intensity is no more than a threshold while the moving status is the moving state, the controller is configured to disconnect the wireless LAN communication with the base station,
when the calculated distance is at least a certain value, the controller is configured to raise the threshold, and
the calculated distance is calculated during a time interval after the moving status changes from the stopped state to the moving state.

5. A mobile electronic device, comprising:
a first communicator configured to perform wireless communication by a first communication standard;
a second communicator configured to perform wireless communication by a second communication standard, the second communication standard being different from the first communication standard;
a detector configured to detect electric field intensity of radio waves received from a base station:
an acceleration sensor configured to
detect an acceleration of the device, and
output an accelerative signal indicating a value of the acceleration;
a calculator configured to calculate a distance moved by the mobile electronic device, based on the accelerative signal, and
a controller configured to
determine a moving status based on the accelerative value, the moving status comprising:
a moving state in which the device is moving, and
a stopped state in which the device is stopped, and when the controller determines that the moving status is the moving state while the first communicator is communicating, cause
the first communicator to disconnect a communication, and
the second communicator to start a communication,
wherein
the first communicator is configured to perform the wireless communication with the base station by the first communication standard which is a wireless LAN standard,
when the detected electric field intensity is no more than a threshold while the moving status is the moving state, the controller is configured to disconnect the wireless communication by the first communication standard with the base station,
when the calculated distance is at least a certain value, the controller is configured to raise the threshold, and
the calculated distance is calculated during a time interval after the moving status changes from the stopped state to the moving state.

* * * * *